“ ”
United States Patent [19]
Miller et al.

[11] Patent Number: 5,240,542
[45] Date of Patent: Aug. 31, 1993

[54] JOINING OF COMPOSITE MATERIALS BY INDUCTION HEATING

[75] Inventors: Alan K. Miller, Santa Cruz; Wendy Lin, Palo Alto, both of Calif.

[73] Assignee: The Board of Trustees of the Leland Stanford Junior University, Stanford, Calif.

[21] Appl. No.: 579,379

[22] Filed: Sep. 6, 1990

[51] Int. Cl.$^5$ ............................................. B23K 13/01
[52] U.S. Cl. ................................. 156/272.4; 156/275.1; 156/379.7; 156/380.2; 156/380.6; 219/10.43; 219/10.53; 219/10.75
[58] Field of Search ...................... 264/22, 25, 26, 257, 264/258, 327; 425/174.8 R; 156/272.4, 272.2, 308.4, 275.1, 379.7, 380.2, 380.6; 219/6.5, 10.53, 10.75, 10.79, 10.43

[56] References Cited

U.S. PATENT DOCUMENTS

| | | | |
|---|---|---|---|
| 2,520,978 | 9/1950 | Super ................................ | 156/272.4 |
| 3,185,605 | 5/1965 | Osborne et al. ..................... | 264/257 |
| 3,233,292 | 2/1966 | Kramer, Jr. et al. ................ | 249/78 |
| 3,239,403 | 3/1966 | Williams et al. ................... | 156/272.4 |
| 3,462,336 | 8/1969 | Leatherman ...................... | 156/272.4 |
| 3,900,360 | 8/1975 | Leatherman ...................... | 156/272.4 |
| 3,960,629 | 6/1976 | Goldsworthy ..................... | 156/272.4 |
| 4,029,837 | 6/1977 | Leatherman ...................... | 156/272.4 |
| 4,563,145 | 1/1986 | de Maij ........................... | 425/174.8 R |
| 4,636,422 | 1/1987 | Harris et al. ..................... | 264/257 |
| 4,816,102 | 3/1989 | Cavin et al. ..................... | 156/180 |
| 4,871,412 | 10/1989 | Felix et al. ..................... | 156/304.3 |
| 4,992,133 | 1/1991 | Border ............................. | 156/498 |
| 5,001,319 | 3/1991 | Holmstrom ....................... | 219/10.53 |

FOREIGN PATENT DOCUMENTS 62-263025 11/1987 Japan ................. 156/272.4

OTHER PUBLICATIONS

G. Williams et al., "Induction welding of thermoplastic composites", I. Meche (1990), pp. 133-136.
John Border, "Induction Heated Joining of Thermoplastic Composites Without Metal Susceptors," 34th Int. SAMPE Symposium (1989), 2569-78.

Primary Examiner—Jay H. Woo
Assistant Examiner—Robert B. Davis
Attorney, Agent, or Firm—Gregory Garmong

[57] ABSTRACT

Two pieces of composite material are simultaneously joined together throughout an interface between the two pieces, by induction heating the interface region with an induction coil placed, at least in part, adjacent to the bonding region, and forcing the composite material at the interface together while heating. The approach is particularly useful in joining pieces having "long interfaces" whose longitudinal dimension is substantially larger than its transverse dimension, for example the long interfaces between aircraft wing stiffeners and skins. The induction coil is configured so that, at any one longitudinal location along the interface, the primary current flowing therethrough does not flow in opposite directions in the portions of the coil overlying the interface, and preferably flows in substantially the same direction throughout the interface. Unheated "cold spots" in the interface being bonded, which would not bond properly, are thereby avoided. An electrically nonconductive but thermally conductive material may be placed between the induction coil and the composite material pieces to act as both a heat sink and a pressure-applying tool. Bonding may be enhanced by placing a susceptor made of the same materials as the composite materials being bonded but having a higher electrical conductivity, in the interface between the two composite material pieces prior to induction heating.

15 Claims, 4 Drawing Sheets

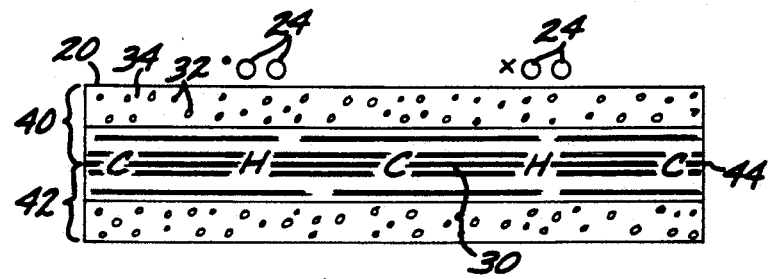
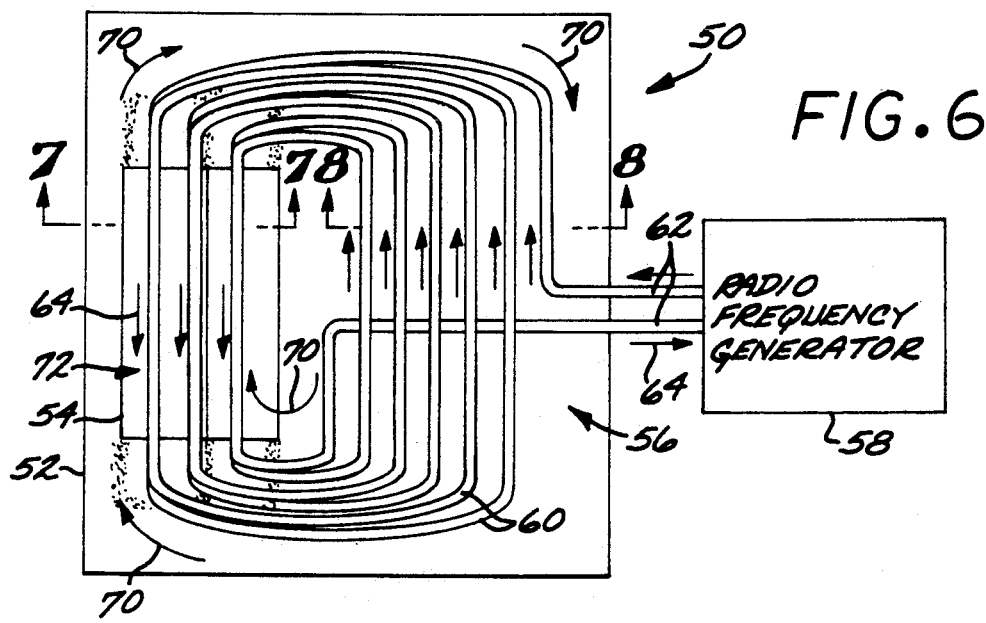
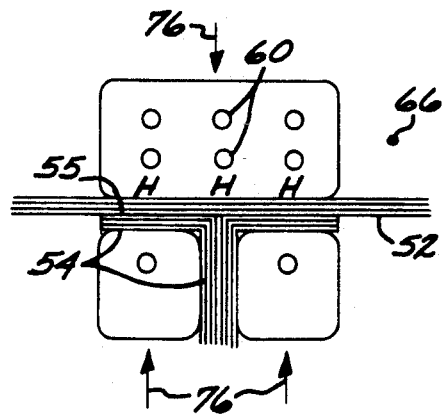
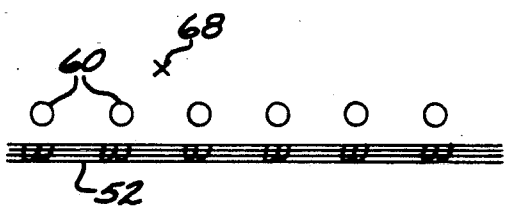

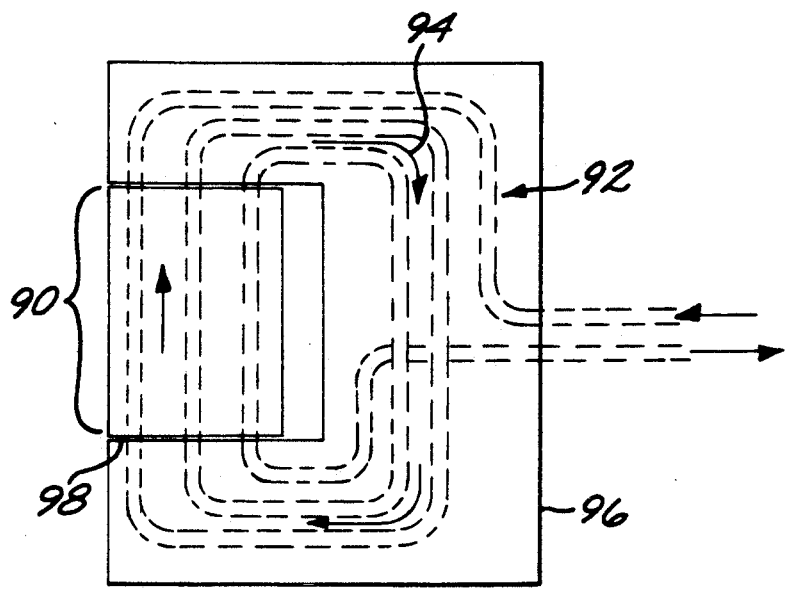
FIG.11
FIG.12
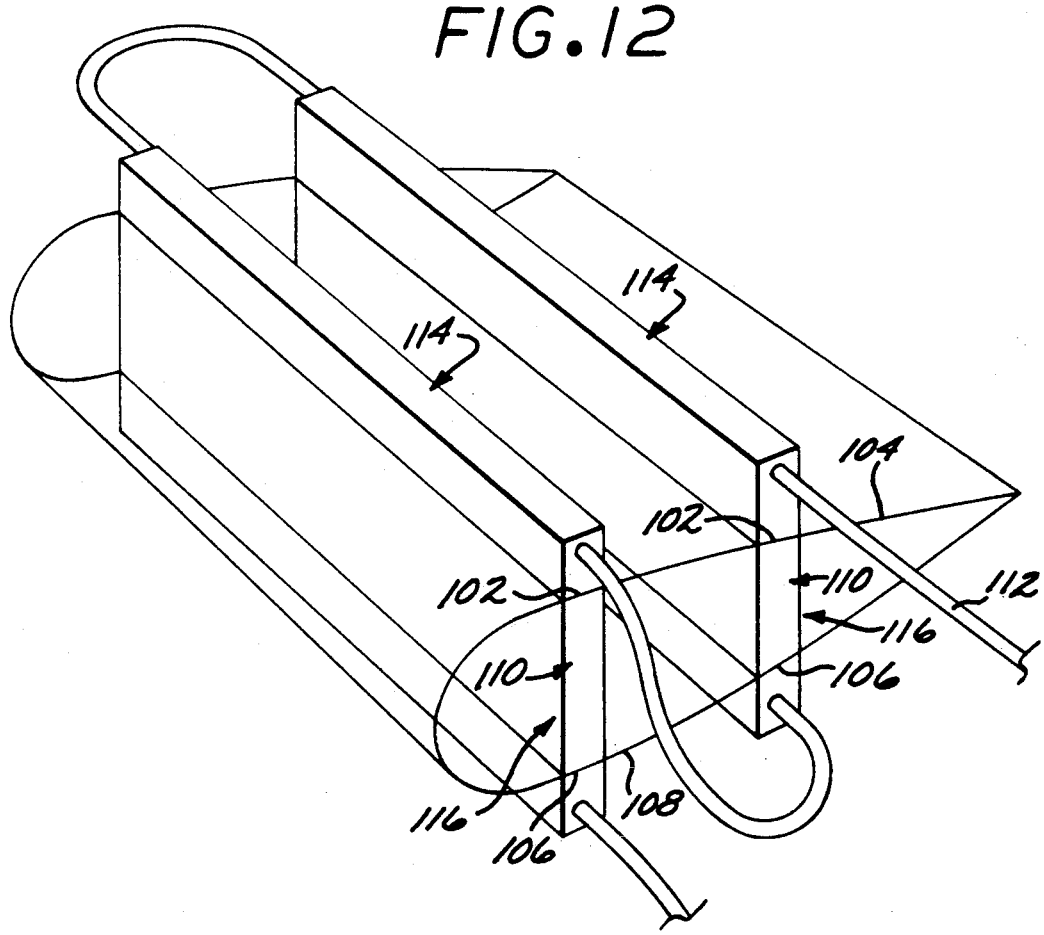

JOINING OF COMPOSITE MATERIALS BY INDUCTION HEATING

BACKGROUND OF THE INVENTION

This invention relates to the joining of composite materials, and, more particularly, to the joining of composite materials by induction heating.

A composite material is a material formed from two or more constituent materials which retain their identities within the composite material. One important type of composite material is the fiber composite material, wherein continuous or discontinuous fibers of one material are embedded within a matrix of another material. Composite materials such as fiberglass have long been known, and have been used in a variety of applications.

In recent years, a number of high-performance composite materials of great interest in aerospace and other demanding applications have been developed. Some materials, such as carbon, can be made very strong and stiff if they are in an elongated fibrous form with a diameter of a few micrometers or less. Such very fine fibers cannot be used directly in structural applications, and instead are incorporated into a matrix which holds the fibers in the proper alignment and protects them from damage. Nonmetallic matrix materials such as thermoplastic or thermosetting resins are widely used in such composite materials. Both the fiber and the matrix can be selected to be quite low in density, with the composite material having a high strength-to-weight ratio. These materials have therefore become the leading candidates for specific structural applications in the next generation of aircraft, to replace aluminum alloys.

The fabrication of a structure using composite materials requires somewhat different procedures than the fabrication of the same structure using metal parts. When metals are used, individual parts are formed by machining, rolling, drilling, and similar procedures, and then joined with fasteners or adhesive. When composite materials are used, parts are prepared by laying up prepreg strips of the composite material or filament winding to form the structure directly. The composite material is then consolidated in an autoclave.

Even when composite materials are used, there must be a method for joining different pieces of composite structure. For example, if a wing of an airplane is to be formed from composite materials, the internal stiffening elements such as the ribs and spars are first prepared and joined together, and then the wing skin is joined to this structural framework. Typically, the length of each stiffener is much greater than the transverse dimension of its interface with the skin. For some of the bonded joints in such a fabricated piece, adhesives are readily applied and provide acceptable performance. However, adhesives cannot be readily applied in other bonded joints. Adhesives may be more brittle and less resistant to loss of properties at elevated temperature than the adherends, compromising their mechanical performance. Moreover, many adhesives require a further autoclave curing treatment, and an autoclave capable of holding the entire wing may not be available. Externally applied fasteners such as rivets are particularly disadvantageous with composite materials because of the high stress concentrations which they introduce into the joint.

An alternative approach that has been used in some bonding applications of thermoplastic-matrix fiber composite materials is co-consolidation, in which the matrix polymer is softened and the two adherends are caused to fuse together at their common interface. In one instance, the two parts are placed inside tooling and inside an autoclave and the entire extent of both parts is heated along with the interface. Application of pressure accomplishes the co-consolidation at the interface. However, the costs for tooling, equipment, and energy are high. Accordingly, another approach is to apply localized heating to cause only the interfacial region between the two composite pieces to become plastic and flowable, force the pieces together in this state, and then remove the heat. If this procedure is performed properly, the two composite pieces are fused into one piece. There is little or no evidence of the original interface, and the final part is a single integral piece. This approach is very promising, because premature failure sources associated with the interface or adhesives are not present.

One promising heating source used to provide localized heating is an induction heater. Such a heater typically includes a generally planar coil of tubing, through which cooling water flows, and to which a high frequency electrical primary alternating voltage is applied. The current in the induction coil causes induced currents to flow in electrically conducting portions of the composite materials, such as carbon or graphite fibers where they are used.

By experience it has been found that the composite structures fabricated by the induction heating process typically have nonuniformities in the form of unbonded regions, or regions in which the original adherends have become deconsolidated because of excessive local heating. These unbonded or deconsolidated regions are difficult or impossible to repair, and can lead to premature failure of the structure. There is therefore a need for an approach to the bonding of composite material pieces that achieves the benefits of induction bonding, but ensures a good quality fabricated part. The present invention fulfills this need, and further provides related advantages.

SUMMARY OF THE INVENTION

The present invention provides an apparatus and process for joining pieces of composite materials using induction heating. The joining operation is fast, controllable, and heats only the regions where the bonding is to be accomplished. The bonded joint is of high quality throughout, without unbonded regions that result from the cold spots observed when prior techniques are used. Tooling is simplified and is less costly compared to that required for autoclave co-consolidation, because tooling is only required at the joints. The approach of the invention is applicable to a variety of composite materials joining applications wherein the interface at which the joining is to occur is extensive and is relatively near a free surface. The approach is especially applicable to the joining of pieces along long interfaces.

In accordance with the invention, an apparatus for joining together two pieces of composite material comprises means for induction heating an interface between two pieces of composite material simultaneously throughout the lateral extent of the interface, the induction heating being produced by a primary alternating current adjacent to the interface that flows in a single direction at one longitudinal location along the interface at any moment.

Stated alternatively, an apparatus for the joining of two pieces of composite material throughout an interface between the two pieces comprises a means for inducing a global current flow in the pieces of the composite material simultaneously throughout the entire interface, there being no inversions of the current flow direction across the extent of the interface at any longitudinal location.

The composite pieces to be joined together are placed into contact along an interface. The pieces are normally at least partially supported laterally with tooling, and may have other tooling in the form of platens to apply a force normal to the interface containing the bonding region.

A specially configured induction coil is positioned adjacent to the interface and particularly the regions of the interface which are to be joined by induction heating. In the prior approach, a conventional "pancake" spiral induction coil or an oval coil was placed over the interface, with all or most of the coil overlapping the interface in a plan view. It has now been discovered that such conventional coil configurations and placement result in a "cold center" in the interfacial region below a portion of the induction coil. This cold center results from the multi-directional nature of the current flows induced by the coil in the composite material, and will be discussed in more detail subsequently. The cold center in turn results in the corresponding region of the composite material interface not being heated to the joining temperature, and produces the bonding defects seen in such composite structures joined by this procedure.

The present invention provides for induction heating throughout the entire bonded interfacial area simultaneously, with no unheated and unbonded regions caused by the cold center effect. This heating is achieved by configuring the induction coil so that the primary current through the induction coil flows in a single direction at any longitudinal location, or at least does not turn back through an arc of more than about 90 degrees, unlike the prior approach where pancake or oval coils are placed entirely over the bonding region.

In one type of application of the present approach, a multiturn, planar induction coil of dimensions larger than the bonding area is placed such that only a portion of the coil overlies the bonding area of the interface. The selected portion of the induction coil is that portion wherein the primary currents in the electrical conductors of the coil all run in the same direction. The number of turns and the plan view configuration of the coil are chosen so that the selected portion of the coil extends over the entire bonding area. Thus, the induction coil is custom selected for the interface to be bonded.

The global induced current produced in the composite material at any one longitudinal location by this configuration of induction coil is generally uniform in direction throughout the extent of the bonding region. There are no cold centers that can result in unbonded locations. The induction coil is preferably maintained stationary relative to the composite material workpiece, which is an advantage because it simplifies the bonding apparatus, but the two can be moved relative to each other if necessary.

This approach to induction coil design is applied to more complex structural configurations than a single bonded joint. For example, if two parallel stiffeners are to be joined to a sheet, the joining is accomplished for both stiffeners at the same time by using an oval induction coil dimensioned such that one side of the oval overlies the interfacial bonding region of one stiffener, and the other side of the oval overlies the interfacial bonding region of the other stiffener.

The present invention further provides a nonmetallic heat sink that is placed in contact with the external surfaces of the composite pieces being joined near the interface region being heated. The nonmetallic heat sink, preferably made of a ceramic such as alumina, accelerates the flow of heat out of the near-surface regions into the heat sink. The heat sink, being made of an electrically nonconducting material, is not itself heated by the induction coil nor does it interfere with the heating of the composite material. Thus, the heat sink permits the interfaces being joined to be heated to a higher temperature than the rest of the adherends.

Another problem found in the joining of composite materials by induction heating is that the fibers in the composite pieces being joined may not be optimally oriented to couple to the induction field and produce induction heating. Heating of the interfacial regions to the joining temperature therefore requires more power than would otherwise be the case, and an associated heating of unrelated parts of the structure. There have been attempts to place thin susceptors, such as metallic wire screens, into the interface in the bonding region to increase the coupling to the induction field, thereby localizing the heating in the parts of the composite material pieces proximate the interface. This approach has a serious drawback of permanently placing a foreign material into the interface, obviating the bondline-removal advantages otherwise attained with the induction technique.

In the present approach, a thin piece of composite material, having the conducting fibers oriented so as to strongly couple to the induction field and carry current to produce heating, is placed between the pieces being bonded. In most instances, the pieces being bonded are formed of the same or nearly the same materials, a particular type of conducting fiber in a particular type of matrix. The composite material susceptor is chosen to be of the same material, so that no foreign substance is introduced into the bonding region. The composite material susceptor is selected so that the conducting fibers are oriented parallel to the primary conductors of the induction coil that generate the induced field, so as to achieve a good induced current flow in the interfacial region. The presence of a small thickness of the composite material has little effect on the properties of the final structure, and provides a transition between the two bonded pieces.

The present invention thus provides a basic approach and several added features that permit the joining of pieces of composite materials by induction heating, while avoiding unbonded defects within the bonded regions and also avoiding unnecessary overheating of the composite material pieces at locations remote from the interface where bonding occurs. Other features and advantages of the invention will be apparent from the following more detailed description of the preferred embodiments, taken in conjunction with the accompanying drawings, which illustrate, by way of example, the principles of the invention.

BRIEF DESCRIPTION OF THE DRAWINGS

FIG. 5 is a diagrammatic sectional view like that of FIG. 2, where the piece of material includes two pieces of cross-plied composite material meeting at an interface;

FIG. 6 is a diagrammatic plan view of apparatus for joining pieces of composite material;

FIG. 7 is a diagrammatic sectional view of the apparatus of FIG. 6, taken along line 7—7 of FIG. 6;

FIG. 8 is a diagrammatic sectional view of the apparatus of FIG. 6, taken along line 8—8 of FIG. 6;

FIG. 11 is a diagrammatic plan view of two composite material pieces being joined, with a global current loop closing; and FIG. 12 is a diagrammatic perspective view of apparatus for joining multiple stiffeners to a wing skin.

DETAILED DESCRIPTION OF THE PREFERRED EMBODIMENT

Figure 1:
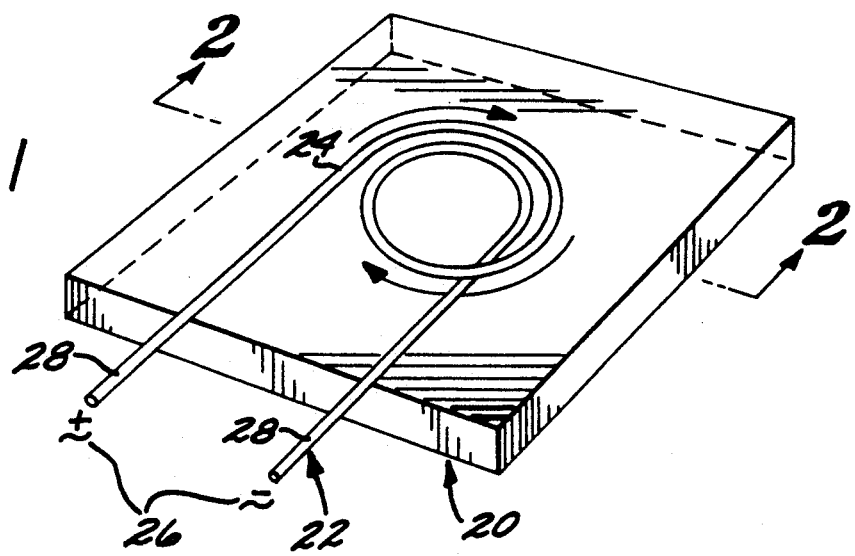
FIG. 1 is a perspective view of a piece of material being heated by an overlying induction coil.

The physics of the heating of composite materials formed of electrically conducting fibers in an electrically nonconducting matrix by induction heating is significantly different from the heating of metals by induction heating, as will be illustrated with reference to FIGS. 1-4. FIG. 1 is a perspective view of a generally planar piece 20 of material having a generally planar, induction heater 22 positioned thereabove. The induction heater 22 is formed from a planar coil of electrical conductors 24, in this case two turns of the conductors in the region of the piece 20. A power supply 26 applies a high frequency alternating current between the leads 28 of the induction heater 22, in turn applying the alternating current to the electrical conductors 24.

Figure 2:
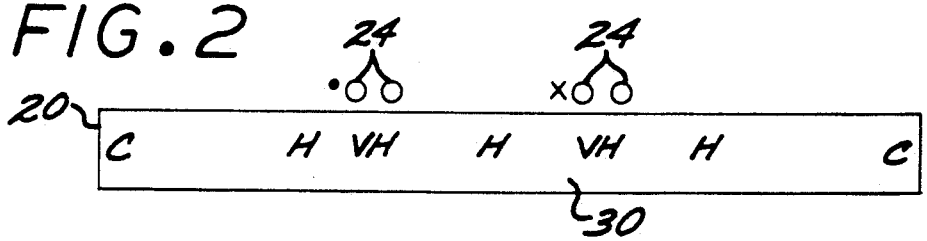
FIG. 2 is a diagrammatic sectional view through the piece of material and induction coil of FIG. 1, taken along line 2—2, where the piece of material is a metal.

FIG. 2 presents a sectional view through the induction heater 22 and piece 20 of material, where the piece of material is a metal having a good electrical conductivity. Such heating of metal is the most common application of induction heating. The metal is a good electrical conductor, and the electrical conductivity is approximately independent of the direction of measurement.

The portion of the metal piece 20 directly below the electrical conductors 24 is strongly heated, as indicated by the symbol "VH" (for "very hot"). The heating occurs because the alternating current in the conductors 24 induces a responsive induced current in the electrically conducting metal piece 20, and that induced current in the piece produces ohmic heating of the piece. The induced current in the workpiece flows in a pattern whose size, shape, and direction of current flow roughly parallels the current flowing through the coil. Since the current flowing through the coil forms essentially a complete loop, the current in the workpiece does the same. This is the "global current loop" which is discussed subsequently. In the portion of the metal not directly below the electrical conductors 24 and therefore not directly heated by an induced current, but adjacent the strongly heated regions, the metal is heated to a lesser temperature "H" (for "hot") by thermal conduction from the VH region. At a greater distance from the induction heater 22, the piece 20 remains cool, indicated as "C". Significantly, if the size of the coil of the induction heater 22 is not too large, a central region 30 between the conductors 24 is heated by thermal conduction to a temperature H.

Figure 3:
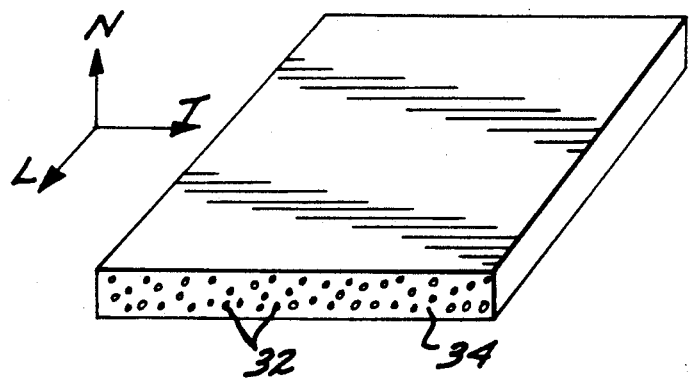
FIG. 3 is a perspective view of a piece of a composite material of electrically conducting fibers in a nonconducting matrix.

FIG. 3 illustrates a composite material having electrically conductive fibers 32 embedded in an electrically nonconductive matrix 34, which also has a low thermal conductivity. In one class of commercially important composite materials, the fibers 32 are carbon or graphite, and the matrix 34 is an organic thermoplastic polymeric material such as polyetheretherketone (PEEK) or a thermosetting polymeric material such as an epoxy. In FIG. 3, the fibers 32 are unidirectional and oriented parallel to a longitudinal direction L. The electrically conductive fibers 32 can be further characterized as occupying a particular fraction of the total volume of the material, which is typically in the range of about 20-70 volume percent. The direction perpendicular to the fibers 32 and in the plane of the piece 20 is termed the transverse direction T, while the direction perpendicular to the plane of the piece 20 is termed the normal direction N. The electrical conductivity of the composite piece 20 is dependent upon the direction of measurement, and is generally higher in the L direction than in the T or N directions, because the conductive fibers 32 are oriented parallel to the L direction.

When the piece 20 is a composite material such as shown in FIG. 3 (rather than a metal such as shown in FIG. 1), an induced current can flow along the length of the fibers 32 in the longitudinal direction L. There is essentially no induced current in the matrix 34, because it is electrically nonconducting. There is also essentially no induced current in the transverse direction T or the normal direction N, because there is no continuous electrically conducting path extending in those directions.

A unidirectional laminate or piece such as that in FIG. 3 can be placed adjacent to a pancake induction coil to attempt to heat it by induction. Because the fibers all run in the same direction, at some locations the fibers will be roughly parallel to the coil tubing, and at other locations the fibers will be roughly perpendicular to the coil tubing. At the locations where the fibers are parallel to the coil tubing, current can be induced in a direction parallel to the coil current (i.e., along the fibers), but at the other locations where the fibers are perpendicular to the coil tubing, the required current cannot be induced, because the composite workpiece has essentially no electrical conductivity in the required direction. Thus, if a unidirectional composite laminate such as that shown in FIG. 3 is placed under a pancake induction coil, the required global current loop will not form and the laminate will not heat.

Figure 4:
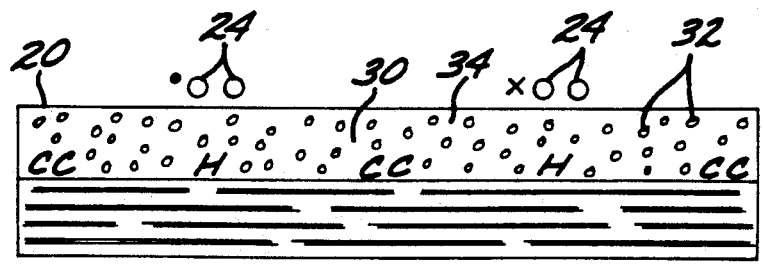
FIG. 4 is a diagrammatic sectional view like that of FIG. 2, where the piece of material is a cross-plied composite material.

In most applications of composites, fibers are placed in various directions in the plane of the laminate to confer stiffness and strength in multiple directions. Typically this is accomplished by placing separate unidirectional plies of the laminate in various directions during its fabrication. In such a "cross-plied" laminate, there are multiple in-plane directions having good electrical conductivity. FIG. 4 illustrates the response produced by the induction coil configuration of FIG. 1, where the piece 20 is a cross-plied composite material laminate. Because the fibers run in multiple in-plane directions, the global current loop mentioned above can form. The regions directly below the electrical conductors 24 of the induction heater are heated to a temperature H. The laterally adjacent regions of the piece 20 that are not below the electrical conductors 24 are not heated directly by induced currents and remain in the cool or C condition because there is little thermal conduction laterally from the H regions due to the low thermal conductivity of the polymeric matrix material. The central region 30 experiences very little if any heating, producing a "cold center" under the center of the induction heater 22 that is not present for the more common case of a metal heated by an induction heater because of the thermal conductivity of the metal.

The present invention is concerned with the joining of two pieces of composite material by induction heating. FIG. 5 depicts a key problem inherent in such joining, in the same view as FIG. 4. Two pieces of cross-plied composite material 40 and 42 are placed together along an interface 44. The electrical conductors 24 produce a heating pattern in the composite materials 40 and 42 somewhat similar to that depicted in FIG. 4, for the same reasons. The central region 30 is heated very little if at all.

The pieces of composite materials 40 and 42 are bonded together in those regions of the interface 44 that are heated to the H or high temperature. There is essentially no bonding in the central region 30, because it is not heated.

The present invention achieves complete bonding through the entire interface between the composite materials by avoiding unheated and cold spots at the bonding interface, through careful selection of the induction heater and, in some cases, ancillary tooling. In accordance with the invention, apparatus for the joining of two pieces of composite material throughout an interface between the two pieces comprises an induction heater positioned such that the induction coil overlies an entire interface between two pieces of composite material to be bonded together, the induction heater having at least one length of an electrical conductor; and a source of an alternating current applied to each length of the electrical conductor overlying the interface such that the direction of current flow in each conductor is the same at any moment at any longitudinal position along the interface.

More preferably, apparatus for joining of two pieces of composite material at an interface having a first end and an oppositely disposed second end in the plane of the interface comprises at least two substantially parallel lengths of electrical conductor disposed adjacent to the interfacial region of the composite material and extending from the first end to the second end; and an induction generator that drives a primary electrical alternating current through the lengths of electrical conductor at a frequency sufficient to induce secondary currents in the two pieces of the composite material proximate the interface, such that the primary current flows in the same direction in each of the lengths of electrical conductor at any moment at any longitudinal position along the interface.

FIGS. 6-8 illustrate an apparatus 50 used to join two pieces 52 and 54 of composite material together along an interface 55. In this case, one piece 52 is a sheet of composite material, and the other piece 54 is a localized stiffener (having a T configuration when viewed in cross section) to be bonded to the sheet. The apparatus 50 includes an induction heater 56 energized by a radio frequency (rf) generator 58. The rf generator 58 is of the type commercially available from several manufacturers, and supplies an alternating current at a frequency typically ranging from 200 kilohertz (KHz) to 3 megahertz (MHz), depending upon the specific type of machine utilized.

The induction heater 56 includes at least one, preferably at least two, and most preferably a plurality of electrically conducting loops 60, that are in electrical communication with the outputs of the rf generator 58 through leads 62. In FIGS. 6-8, there are six electrically conducting loops 60 arrayed over the interface 55 between the pieces 52 and 54.

The induction heater 56 is configured so that the primary electrical current applied by the induction generator 58 at any moment in time flows in the same direction through those portions of the electrical conductors 60 that overlie the interface 55. At the moment depicted in FIGS. 6-8, the direction of the primary electrical current is indicated by arrows 64 in FIG. 6, a dot 66 indicating a vector out of the plane in FIG. 7, and a cross 68 indicating a vector into the plane in FIG. 8.

In FIG. 7, which depicts the bonding region and interface 55, the current in each of the conductors 60 flows in the same direction, out of the plane of the drawing. The electrical conductors 60 of FIG. 7 are closely spaced together, and in this depiction stacked in two overlying rows to intensify the induced electrical current at the interface 55. At the interface 55, all regions are heated to a temperature H, and there is no cold center. As a result, the entire interface 55 is heated to the desired bonding temperature.

In FIG. 8, which depicts the region away from the interface and the bonding region, the electrical conductors 60 induce heating of the sheet piece 52, but the conductors 60 are spaced further apart from each other than in the region of the interface. The sheet piece 52 is subjected to less intense heating, and is only warmed as indicated by the letter W.

The induction heater of the invention is configured differently than heaters used in the art. The present induction heater is much larger in lateral extent than the interfacial area to be bonded, to permit the electrical conductors to be arranged such that the electrical current flows through them in only a single direction, over the interface being heated for bonding.

An alternative description of the approach of the invention is based upon the concept of a global current loop. With the induction heater arrangement of FIG. 6, at each moment when current is flowing, there is a macroscopic current flow path in the composite pieces 52 and 54 that roughly mirrors the current flow pattern of the electrical conductors 60 as depicted by the arrows 64, except in the opposite direction. This global current flow is depicted by the arrow 70 in FIG. 6. The global current 70 is unidirectional through a region 72 where the interface 55 between the pieces 52 and 54 is found. That is, the vector 70 indicating the global current flow direction does not reverse itself across the bonding region 72. This may be contrasted with the conventional prior situation depicted in FIG. 5, where the global current flow vector is out of the plane of the illustration for the two conductors 24 on the left hand side, and into the plane of the illustration for the two conductors 24 on the left hand side. In this case, there is a reversal of the global current flow vector through the interfacial region being bonded, contributing to the detrimental cold center effect.

Figure 9:
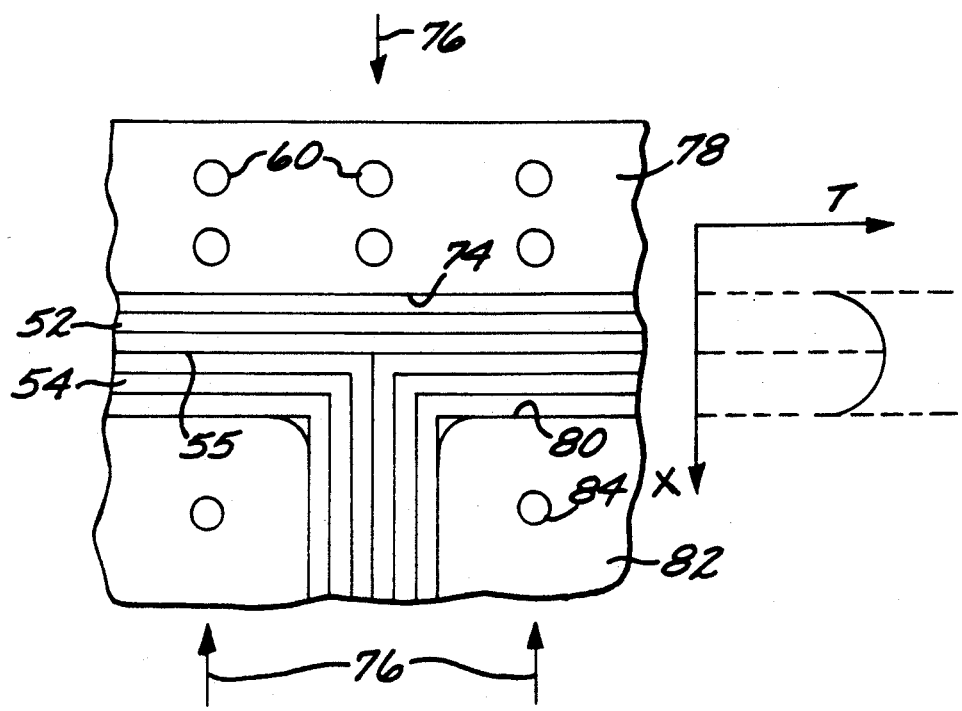
FIG. 9 is a diagrammatic section view like that of FIG. 7, with a superimposed graph of temperature through the pieces being bonded.
Figure 10:
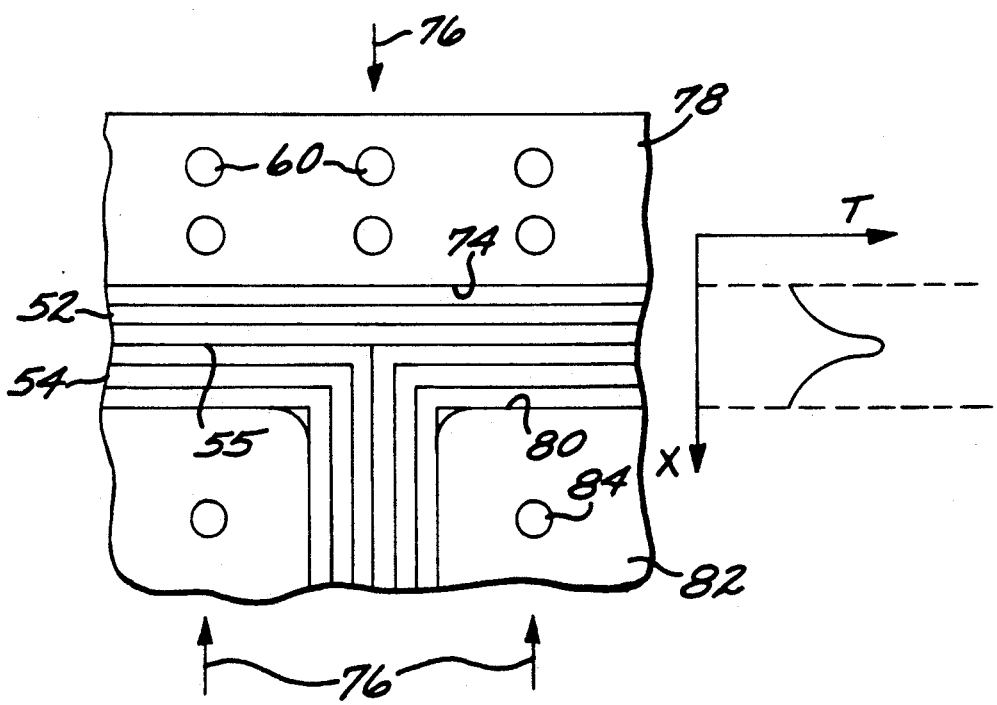
FIG. 10 is a diagrammatic sectional view like that of FIG. 7, illustrating the use of a composite material interfacial susceptor.

FIGS. 9 and 10 illustrate other features of the present invention used to promote temperature control. In order to cause the two adherends to fuse together (co-consolidate) at the interface, the matrix polymer must be heated approximately to its melting temperature. However, since the adherends themselves are typically cross-plied laminates, heating the adherends to the melting temperature of the polymer tends to cause an undesirable deconsolidation of the adherends. Thus, it is desirable to maintain all regions of the adherends, except the interface to be joined, as cool as possible.

In the current approach, the temperature within the pieces 52 and 54 is regulated with tooling that is present to aid in the bonding of the interfaces. Although heating an interior interface 55 may be sufficient to effect bonding along the interface, it is preferred to also apply a compressive force 76 in the normal direction N to the interface 55. To apply that compressive force, electrically nonconducting but thermally conducting tooling is used.

In the particular configuration of FIGS. 7 and 9, the electrical conductors 60 are embedded in a block 78 of an electrically nonconducting material that has a reasonably good thermal conductivity, such as alumina (aluminum oxide) or other ceramic. Since water is passed through the electrical conductors 60 to cool them, heat is removed from the near surface 74 by conduction through the block 78. A back surface 80 of the stiffener piece 54 is supported by conforming tooling 82 made of the same type of material as the block 78. The tooling 82 may optionally be cooled by embedded cooling lines 84 through which water is passed, removing heat from the back surface 80. Alternatively, since typically the bonding is done in short times, the heat capacity of the tooling may be sufficient to keep it at a low temperature (relative to the interface) without requiring it to be cooled by water. Thus, it may be sufficient to place the induction coil adjacent to the tooling (on the side opposite from the workpiece) and not embed it within the tooling. Under such conditions, the extra cooling passages 84 are not needed. The compressive force 76 is applied to the interface 55 through the block 78 and the tooling 82.

Superimposed on FIG. 9 is a graph of temperature through the pieces 52 and 54 and the interface 55, as a result of the approach just described. Because the near surface 74 and the back surface 80 are cooled and the composite material between them is heated internally by induction, the maximum temperature is found at the interface 55. This is the desired result, as elevated temperature bonding at the interface 55 can be accomplished without degradation of the other regions of the composite pieces 52 and 54 resulting from overheating. For any particular configuration of pieces to be bonded, a thermal flow model can be constructed to ascertain the precise form of the temperature graph of FIG. 9 using known techniques.

Another obstacle to attaining sufficient and proper heating of the interface 55 for bonding can arise if the fibers of one or both of the composite pieces are either too sparse (i.e., of too low a volume fraction) to permit sufficient heating or are misoriented away from the longitudinal direction of the interface 55. In the first case, if the fraction of fibers in one or both pieces is very low, the total secondary or induced current is not sufficiently high to heat the interfacial region unless an unacceptably high power is applied to the induction heater. In the second case, there may be a high fraction of fibers, but if they are misoriented from the direction parallel to the electrical conductors of the induction heater the induced current is small. In the limiting case, if the conducting fibers lie in the transverse direction T, then there will be virtually no induced current. It is not sufficient to simply reorient the electrical conductors, because the fibers in each piece being bonded can be oriented in different directions. In the most general case, each composite piece may be formed of a number of layers of composite material, with the fibers in each layer lying in different orientations.

The heating intensity at the interface can be intensified by supplying an intermediate layer of composite material at the interface 55 between the pieces 52 and 54, termed herein an interfacial susceptor 86. The fibers in the composite material of the interfacial susceptor 86 are oriented such that a relatively large induced current is produced in the interfacial susceptor, thereby heating it to a higher temperature than would occur in the absence of the intermediate layer. The intermediate layer of the interfacial susceptor 86 is therefore preferably made of the same type of material as the pieces 52 and 54, that is, a composite of the same type of fibers and the same type of matrix. The intermediate layer can have either a higher fraction of the fibers than the pieces 52 and 54, or can be oriented differently with the fibers more nearly parallel to the global current vector, or both. With such an interfacial susceptor 86, the temperature profile through the pieces exhibits a sharper peak, as illustrated schematically in the inset graph of temperature as a function of position of FIG. 10. The interface is thus preferentially heated as compared with the pieces being joined. The use of the interfacial susceptor formed of the same materials as the composite pieces being joined avoids the introduction of foreign substances into the interface.

In some cases, the geometry of the pieces to be joined does not permit the desired global current loop flow, and conductive tooling must be provided to permit such flow. Otherwise, irregular current flows may result. FIG. 11 illustrates a configuration somewhat similar to that of FIG. 6, except that in FIG. 11 the composite pieces being joined are simply two small sheets 90, that are overlying each other. An induction heater 92, illustrated in FIG. 11 in phantom lines, is configured similarly to that of FIG. 6, with a portion of the electrical conductors overlying the sheets 90 so that the current flow in all the conductors is in the same direction, and the rest of each electrical conductor forming the remainder of the loop that does not overlie the sheets 90. This arrangement does not permit a smooth global current flow, of the same form as shown in FIG. 6.

To permit such a current flow, electrically conductive tooling 96 is placed under the portions of the induction heater 92 that do not overlie the sheets 90. The conductive tooling 96 is in electrical contact with the ends 98 of the sheets 90, so that a global current loop 94 may flow from one end of the sheets 90, through the tooling 96, and into the other end of the sheets 90.

The approach of the invention is applicable to the simultaneous formation of multiple interfacial joints in a single operation, as illustrated in FIG. 12. An aircraft wing section 100 requires stiffeners attached to the interior of the upper wing skin and the lower wing skin. As illustrated, two surfaces 102 of two composite stiffeners 116 are joined to the interior surface of a top wing skin 104, and two other surfaces 106 of these same composite stiffeners 116 are joined to the interior surface of a bottom wing skin 108. Two pieces of internal tooling 110 extend between respective stiffener surfaces 102 and 106.

An induction heater 112 is configured according to the principles discussed herein, so that the global current flow through each interface being bonded is substantially unidirectional. (Only a single electrical conductor is shown along each interface in FIG. 12 for clarity of illustration, although multiple conductors can be supplied according to the principles illustrated in FIG. 6.) The electrical conductors of the induction heater are embedded in external compressive tooling 114, in the manner illustrated in FIG. 7. The compressive pressure can be supplied by a press or other mechanical means, or by a vacuum bag (not shown) arranged over the external tooling. The global current loop for the interfaces between the upper stiffener surfaces 102 and the upper wing skin 104 is completed through the upper wing skin 104, or alternatively may be completed through external current flow paths (not shown, but as discussed in relation to FIG. 11). The global current loop for the lower stiffeners is similar.

Thus, using the approaches exemplified by FIGS. 6, 11, and 12, composite pieces can be readily joined along interfaces singly or in multiples, and with or without the need for a conductive susceptor to aid in formation of the global current loop. These teachings can be readily applied by those skilled in the art to a wide variety of simple and complex joining situations.

By the approach described above, adherends of cross-piled laminates of graphite-polyetheretherketone (gr-PEEK) have been joined together. In one case, a circular pancake coil was used to join together circular adherends along a circular annulus. In a second case, a rectangular pancake coil was used to join together adherends along a rectangular annulus. The joints have been inspected ultrasonically and found to be sound, and no deconsolidation of the laminates was observed. Instrumented tests of the type described above have proved that the surfaces of the adherends can be kept substantially cooler than the interface being bonded, and that the heat can be localized to the region of the induction coil.

Although particular embodiments of the invention has been described in detail for the purpose of illustration, various modifications may be made without departing from the spirit and scope of the invention. Accordingly, the invention is not to be limited except as by the appended claims.

What is claimed is:

1. Apparatus for joining together two pieces of composite material at an interface between the two pieces, comprising:
   means for induction heating the interface between two pieces of composite material simultaneously throughout the lateral extent of the interface, the means for induction heating including
   at least two lengths of electrical conductors placed adjacent to the interface, and
   means for passing an alternating current through the at least two lengths of electrical conductor such that the alternating current flows in a single direction at any moment throughout the lateral extent of the interface at any longitudinal location along the interface.

2. The apparatus of claim 1, further including:
   an electrically nonconducting heat sink disposed between the means for induction heating and the pieces of the composite materials, and contacting at least one of the composite pieces.

3. The apparatus of claim 1, wherein the means for induction heating includes an induction coil having portions thereof lying adjacent to the interface and other portions thereof not lying adjacent to the interface, all of the portions lying adjacent to the interface configured to have the primary alternating current flow therethrough in the same direction at any moment and at any longitudinal location.

4. The apparatus of claim 3, wherein the induction coil is formed as a hollow tube.

5. The apparatus of claim 3, wherein the induction coil has at least two turns, with a portion of each turn lying adjacent to the interface.

6. The apparatus of claim 3, wherein the induction coil is oval in shape in plan view.

7. The apparatus of claim 3, further including a second interface between two pieces of composite material to be bonded together, wherein a second portion of the induction coil lies adjacent to the second interface and heats the second interface at the same time as it heats the first interface.

8. The apparatus of claim 1, wherein the primary alternating current has a frequency of from about 200 KHz to about 3 MHz.

9. Apparatus for the joining of two pieces of composite material throughout an interface between the two pieces, comprising:
   an induction heater positioned such that the induction coil overlies an entire interface between two pieces of composite material to be bonded together, the induction heater having at least two lengths of an electrical conductor; and
   a source of an alternating current applied to each length of the electrical conductor overlying the interface such that the direction of current flow in each conductor is the same at any moment at any longitudinal position along the interface.

10. The apparatus of claim 9, wherein the induction heater is planar, with the plane of the heater substantially parallel to the interface.

11. Apparatus for joining of two pieces of composite material at an interface having a first end and an oppositely disposed second end in the plane of the interface, comprising:
   at least two substantially parallel lengths of electrical conductor disposed adjacent to the interfacial region of the composite material and extending from the first end to the second end; and
   an induction generator that drives a primary electrical alternating current through the lengths of electrical conductor at a frequency sufficient to induce secondary currents in the two pieces of the composite material proximate the interface, such that the primary current flows in the same direction in each of the lengths of electrical conductor at any moment at any longitudinal position along the interface.

12. The apparatus of claim 11, wherein the lengths of electrical conductor are portions of a single coil, the single coil including other portions that do not lie above the interface.

13. A process for joining together two pieces of composite material throughout an interface between the two pieces, comprising:

providing two pieces of composite material;

placing the two pieces into contact at an interface; and positioning an induction heater adjacent to the interface, the electrical conductors of the induction heater that lie adjacent to the interface being configured such that a primary current passing through each electrical conductor that lies adjacent to the interface flows in a single direction at any moment at any longitudinal location;

passing a primary current through the induction heater to heat the two pieces of composite material proximate the interface.

14. The process of claim 13, further including a piece of a composite material made of the same constituents as at least one of the pieces being bonded, but having an electrical conductivity greater than either of the pieces being bonded, disposed in the interface between the two pieces being bonded.

15. The process of claim 13, wherein one piece of the composite material is a stiffener and the other piece is a skin.

* * * * *